United States Patent

Goto et al.

[11] Patent Number: 5,828,397
[45] Date of Patent: Oct. 27, 1998

[54] IMAGE FORMING METHOD AND APPARATUS

[75] Inventors: Hiroshi Goto, Itami; Satoshi Deishi, Ibaraki, both of Japan

[73] Assignee: Minolta Co. Ltd., Osaka, Japan

[21] Appl. No.: 551,345

[22] Filed: Nov. 1, 1995

[30] Foreign Application Priority Data

Nov. 4, 1994 [JP] Japan .................................. 6-270829
Nov. 11, 1994 [JP] Japan .................................. 6-277321

[51] Int. Cl.$^6$ .............................. B41J 2/39; B41J 2/395; H04N 5/262; H04N 9/64
[52] U.S. Cl. ........................ 347/131; 347/274; 347/251; 358/518
[58] Field of Search ................................... 347/131, 232, 347/240, 247, 251–254; 358/520, 518, 521, 523, 524, 298, 534–536, 504; 3985/109; 382/162, 167

[56] References Cited

U.S. PATENT DOCUMENTS

| | | | |
|---|---|---|---|
| 4,342,051 | 7/1982 | Suzuki et al. | 358/283 |
| 4,791,882 | 12/1988 | Enoguchi et al. | 118/653 |
| 4,967,211 | 10/1990 | Colby et al. | 346/160 |
| 5,041,920 | 8/1991 | Hayes et al. | 358/456 |
| 5,253,082 | 10/1993 | Hayashi et al. | 358/296 |
| 5,453,773 | 9/1995 | Hattori et al. | 347/129 |
| 5,574,563 | 11/1996 | Hayashi et al. | 347/131 |
| 5,638,183 | 6/1997 | Hayashi et al. | 347/129 |

*Primary Examiner*—Peter S. Wong
*Assistant Examiner*—Bao Q. Vu
*Attorney, Agent, or Firm*—Sidley & Austin

[57] ABSTRACT

A tone image processing apparatus comprises a setting device and a generating device. The setting device sets a plurality of tone levels in accordance with image density of an original. For reproduction an image of the original, the generating device generates a plurality of density values corresponds to the tone levels. The difference between one density value and next density value is increased over all the tone levels as the tone level becomes higher.

12 Claims, 11 Drawing Sheets

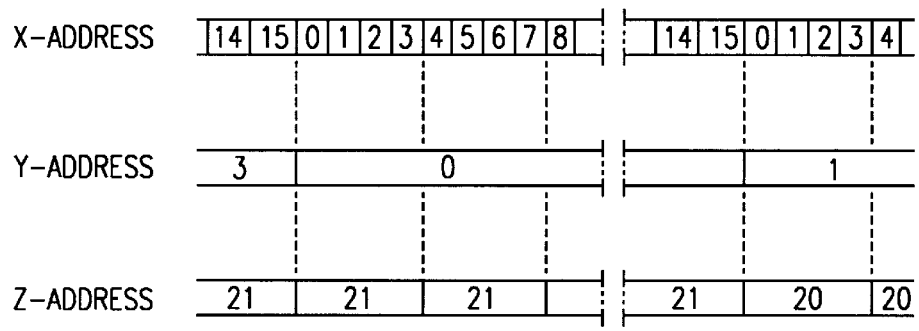
FIG. 5
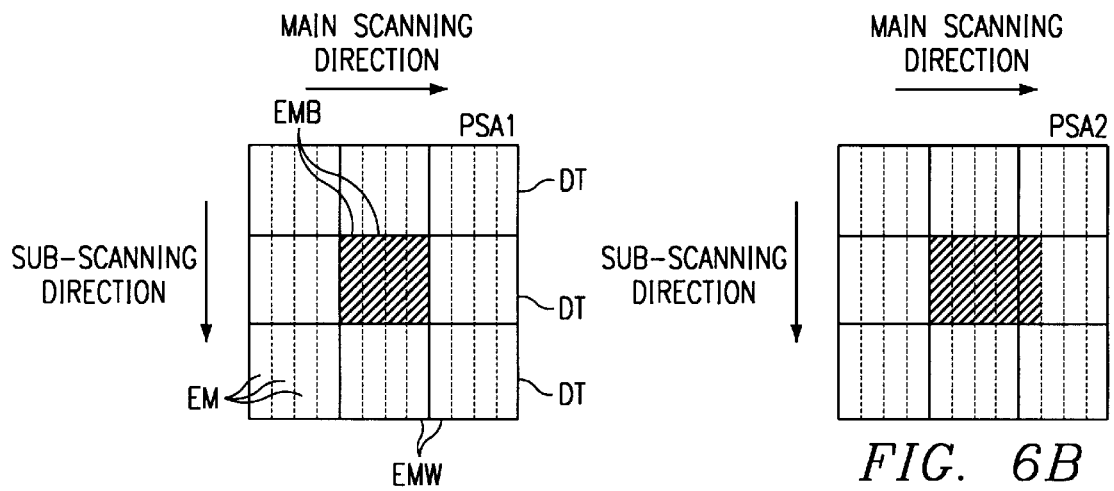
FIG. 6A
FIG. 6B
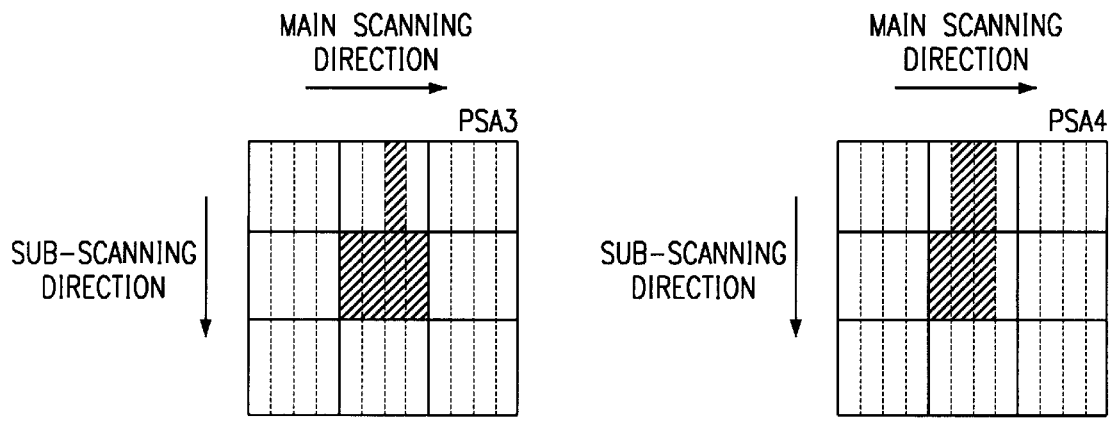
FIG. 6C
FIG. 6D

FIG. 11A
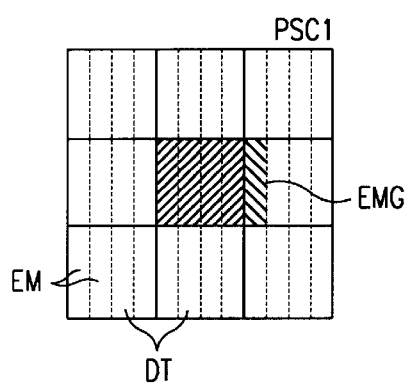
FIG. 11B
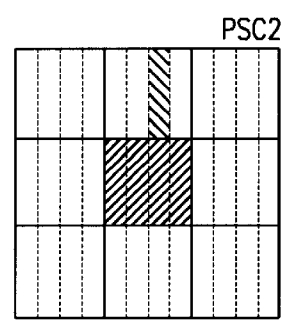
FIG. 11C
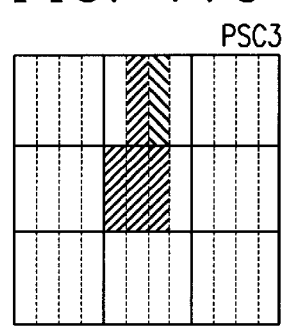
FIG. 12A (PSC2)
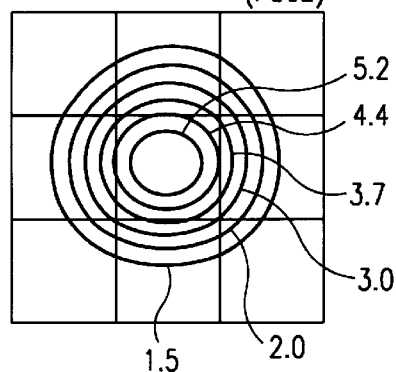
FIG. 12B (PSC2)
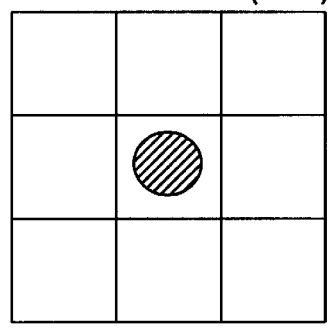
FIG. 13
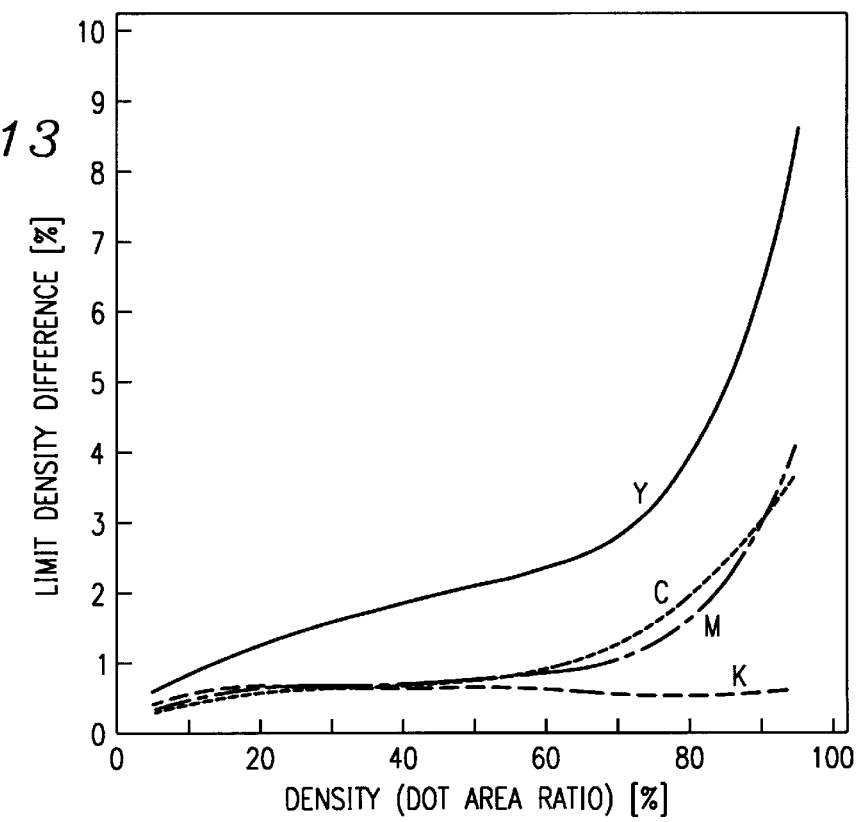

IMAGE FORMING METHOD AND APPARATUS

BACKGROUND OF THE INVENTION

1. Field of the Invention

The present invention relates to an image forming method and apparatus for forming multi-tone images.

2. Description of the Related Art

In image forming apparatus such as page printers, digital copying apparatus, and facsimiles, dot matrix methods such as a density pattern method and a dither pattern method have been used as the tone reproduction method for outputting multi-tone images onto paper.

The density pattern method is a method in which threshold values for the dots (elements) of an m*n matrix are associated with each single element of an original image so that a plurality of tone levels are represented by a plurality of mutually dissimilar dot area patterns.

The dither pattern method is a method in which threshold values for the dots of an m*n matrix are associated with each single picture element of an original image in one-to-one correspondence. The dither pattern method can be classified into Fattening types (dot-concentrated types) wherein dots are concentrated in the center of the matrix in halftone levels, and Bayer types (dot-dispersed types) wherein dots are dispersed throughout the entire matrix in halftone levels.

For the formation of hard copy images by the electrophotographic processes, when a Bayer type threshold value matrix is used, there is a tendency that a high degree of gamma recording characteristics result due to the effect of intensity distributions of exposure using laser beam or others. For this reason, a Fattening type threshold value matrix is used in usual cases.

On the other hand, when a Fattening type threshold value matrix is used, resolution is reduced when the matrix size is increased to increase the number of tone levels, and the number of tone levels is diminished when the matrix size is reduced to improve resolution.

By using these tone reproduction methods, multi-tone images has been output on the paper to a certain extent. However, there has been desired an image forming method and apparatus which are capable of outputting multi-tone images with high resolution and good reproducibility of tone level.

SUMMARY OF THE INVENTION

Accordingly, an object of the present invention is to provide an image forming method and apparatus that are capable of outputting multi-tone images with good reproducibility.

Another object of the present invention is to provide an image forming method and apparatus that are capable of outputting multi-tone images with good tone level and that are capable of minimizing the number of tone levels.

According to one aspect of the present invention, there is provided a tone image processing method comprising:

setting a plurality of tone levels in accordance with image density of an original; and setting a plurality of density values for reproducing an image of the original, said density values corresponding to said tone levels, and the difference between one density value and next degree of density value being increased over the tone levels as the tone level becomes higher.

There is also provided a tone image processing apparatus comprising:

a setting device which sets a plurality of tone levels in accordance with image density of an original; and a generating device which generates a plurality of density values for reproduction of an image of the original, said density values corresponding to said tone levels, and the difference between one density value and next density value being increased over all the tone levels as the tone level becomes higher.

Preferably, said tone image processing apparatus reproduces a plurality of tone images. In this case, the plurality of tone images may be different from each other in color. A total number of the tone levels may be different with each color. A difference of density value between specified tone levels may be different with each color. The difference of a density value between tone levels may be unrecognizable to the naked eye.

Preferably, the apparatus further comprises:

an image forming device which forms an image;

a memory which stores a plurality of patterns corresponding to a plurality of density values, each of said plurality of patterns defining a number of image forming operations and positions of image forming operations; and an operating device which operates the image forming device in accordance with said plurality of patterns.

In this case, the apparatus may further comprise a control unit which selects one of the plurality of patterns in accordance with the density value and controls the operating device in accordance with said selected pattern. The plurality of patterns may include at least two patterns identical in number of operations but different in positions of operation within each pattern.

According to another aspect of the invention, there is provided an image forming method performed in an image forming apparatus comprising an electrostatic latent image carrier, said method comprising the steps of:

irradiating light in accordance with a plurality of irradiation patterns for forming an electrostatic latent image on said electrostatic latent image carrier, each of the irradiation patterns defining an irradiation energy amount and positions for irradiation, said irradiation patterns including at least a first pattern and a second pattern, said second pattern being identical to said first pattern in irradiation energy amount but different from said first pattern in position of irradiation; and developing said electrostatic latent image formed by said irradiated light on said electrostatic latent image carrier with a developing device, said developing device having a toner carrying member which includes a movable thin film developing sleeve confronting said electrostatic latent image carrier and holding a toner thereon.

There is also provided an image forming apparatus comprising:

an image carrying member on which a latent image is retained;

an irradiation device which irradiates light on said image carrying member for forming said latent image in accordance with a recording data;

a developing device which develops the latent image formed by said irradiation device on the image carrying member, said developing device having a toner carrying member which includes a thin film developing sleeve confronting said electrostatic image carrier and holding toner thereon;

a memory which stores a plurality of patterns corresponding to a plurality of tone levels, each of said plurality of patterns defining an irradiation energy amount and positions for irradiation, said plurality of patterns including at least two patterns which are identical in irradiation energy amount but different in positions of irradiation; and a control unit which selects one of said plurality of patterns stored in said memory and generates the recording data in accordance with said selected pattern.

Preferably, said irradiation energy amount is determined by a total irradiating time within each pattern. In this case, said irradiation device may vary a tonal irradiating time in accordance with said recording data for changing of the irradiation energy amount within a specific range.

Preferably, said irradiation device includes a laser optical system which radiates a laser beam. In this case, said control unit may control the intensity of the laser beam between three or more levels.

Preferably, said plurality of patterns are arranged in a m*n matrix. In this case, value of each cell of said m*n matrix may be binary.

Preferably, said memory includes a read only memory (ROM).

Preferably, said developing device includes a developing roller having a peripheral length shorter than that of the thin film developing sleeve, and the thin film developing sleeve is loosely mounted around said developing roller.

Preferably, said developing device is a one-component developing device.

BRIEF DESCRIPTION OF THE DRAWINGS

These and other objects, advantages and features of the invention will become apparent from the following description thereof taken in conjunction with the accompanying drawings illustrate specific embodiments of the invention, in which:

FIG. 5 is a timing chart of addressing;

FIGS. 6A, 6B, 6C, and 6D show examples of exposure patterns;

FIGS. 11A, 11B, and 11C show examples of ternarized exposure patterns;

FIGS. 12A and 12B show a state of irradiated energy and a recording state on recording paper corresponding to the exposure pattern shown in FIG. 12B;

FIG. 13 is a graph showing the relationship between density and limit density difference;

In the following description, like parts are designated by like reference numbers throughout the several drawings.

DETAILED DESCRIPTION OF THE PREFERRED EMBODIMENTS

Figure 1:
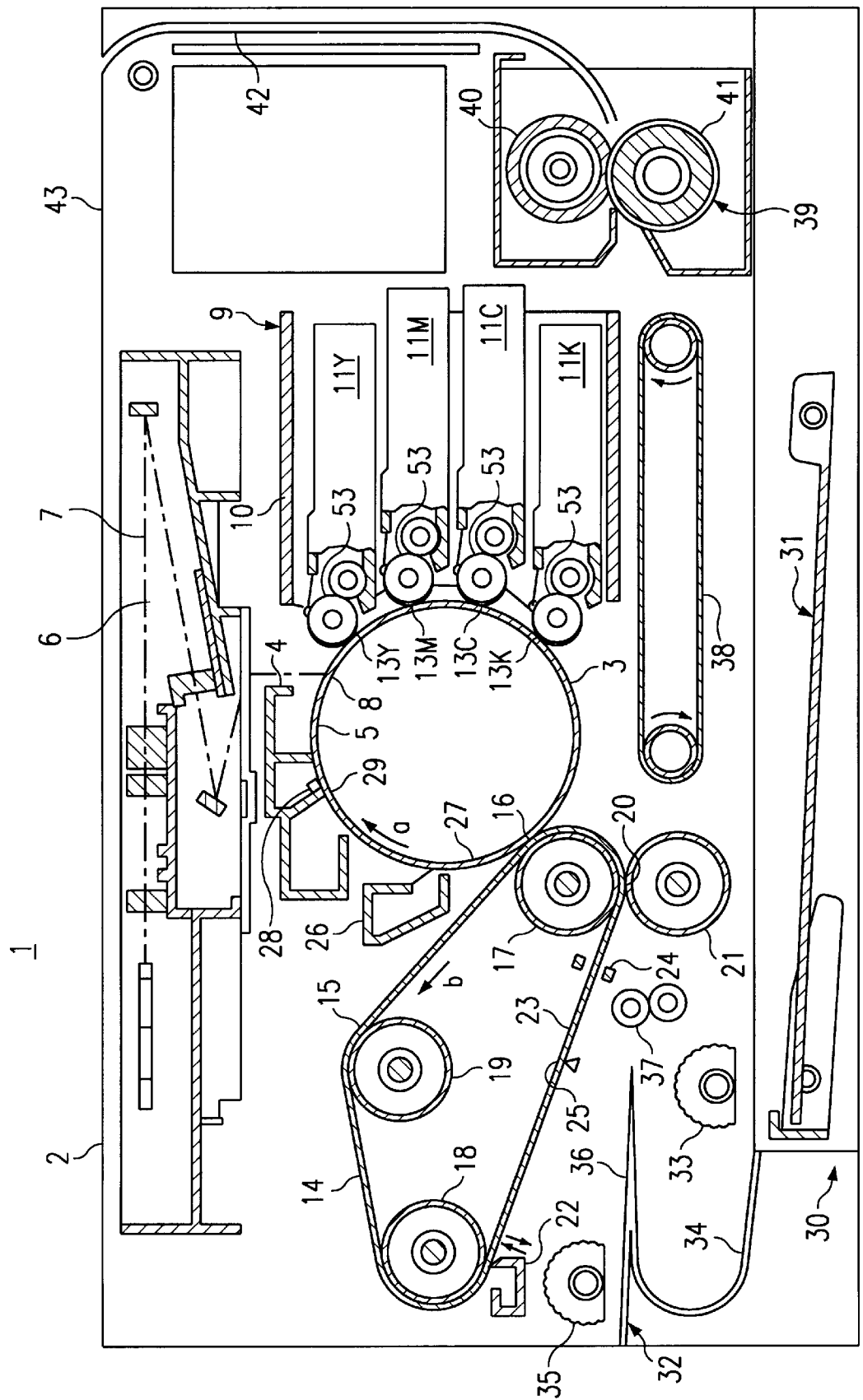
FIG. 1 is a front sectional view showing a system configuration of a color page printer according to the present invention.

FIG. 1 is a front sectional view showing the system configuration of a color page printer 1 according to the present invention.

The color page printer 1 forms an image on paper by electrophotographic processes. A photosensitive drum 3, which is an electrostatic latent image carrier, is disposed in the center of a housing 2. The photosensitive drum 3 is a cylindrical drum with outer diameter 100 mm and with an organic photosensitive layer on its outer periphery, and is rotatable about an unshown axis in a direction of arrow "a" at a constant system speed.

Around the photosensitive drum 3, there are arranged a charger 4 of the corona discharge type that uniformly charges the surface of the photosensitive drum 3, a developing unit 9 for developing a latent image into a toner image, an intermediate transfer unit 14, a cleaning unit 26 and an eraser 28. Also, a scanning optical unit 6 for forming a latent image is arranged above the charger 4. An optical beam (laser beam) 7 emitted from the scanning optical unit 6 is incident on an exposure area 8 of the photosensitive drum 3.

The developing unit 9 comprises a developing device holder 10, and four developing devices 11Y, 11M, 11C, 11K which are of the one-component contact development method and which are removably fitted to the developing device holder 10. These developing devices 11Y, 11M, 11C, and 11K contain yellow toner, magenta toner, cyan toner, and black toner, respectively. The developing devices 11Y, 11M, 11C, 11K are fitted so as to be movable forward and backward with respect to the photosensitive drum 3. In the developing devices 11Y, 11M, 11C, 11K, developing sleeves 53, which are carriers for their respective developers, are provided so as to be switchable between a developing state, in which the developing sleeves make contact with the outer peripheral surface of the photosensitive drum 3 at developing areas 13Y, 13M, 13C, 13K, and a non-developing state, in which they are away from the photosensitive drum 3. For the process of printing, the developing devices 11Y, 11M, 11C, 11K are selectively brought into the developing state.

The intermediate transfer unit 14 comprises an endless transfer belt 15 to which a toner image formed on the photosensitive drum 3 is transferred; a transfer roller 17 for pressing the outer peripheral surface of the transfer belt 15 against the outer peripheral surface of the photosensitive drum 3 at a primary transfer area 16; a support roller 18 for supporting the transfer belt 15 in cooperation with the transfer roller 17; a tension roller 19 for supporting the transfer belt 15 as well as imparting a specified tension thereto; a second transfer roller 21 to be in contact with the outer peripheral surface of the transfer belt 15 at a second transfer area 20; and a scraper 22 for cleaning the outer peripheral surface of the transfer belt 15. The transfer belt 15 is a 628 mm long (two times the perimeter of the photosensitive member), 340 mm wide, and 150 µm thick seamless belt made of a resin material or metal material having semi-conductivity (electrical resistance: up to $10^7$ Ω.cm). The transfer belt 15 moves in a direction of arrow "b" by a rotating force transferred from an unshown motor to, for example, the transfer roller 17. Also, a detection hole 23 is formed at an edge portion of the transfer belt 15. This detection hole 23 is detected by a reference-position detection sensor 24 composed of a light-emitting element and a light-receiving element, and the timing for driving the various units is controlled based on an output signal of the reference-position detection sensor 24. In addition, the transfer rollers 17, 21 are preferably made of flexible materials such as polyethylene foam in order to ensure sufficient nip widths between the photosensitive drum 3 and the transfer belt 15 and between the transfer belt 15 and a paper. It is also preferable that the primary transfer roller 17 is made of an electrically conductive ($10^6$ Ω.cm) material and the second transfer roller 21 is made of a semi-conductive (up to $10^7$ Ω.cm) material.

Meanwhile, a paper feed unit 30 is disposed at the bottom of the housing 2. The paper feed unit 30 comprises a cassette feed part 31 and a manual feed part 32. Unshown paper accommodated in the cassette feed part 31 is fed to a timing roller pair 37 via a passage 34 with the rotation of a feed roller 33. Also, paper inserted in the manual feed part 32 is fed to the timing roller pair 37 via a passage 36 with the rotation of a feed roller 35. The timing roller pair 37 sends out the paper toward the second transfer position 20 at a specified timing. At the second transfer position 20, the toner image on the transfer belt 15 is transferred onto the paper.

The paper onto which the toner image has been transferred is conveyed to a fixing unit 39 by a paper conveyor unit 38 provided below the photosensitive drum 3. The fixing unit 39 comprises a heat roller 40 with a built-in heater, and a press roller 41 in press contact with the heat roller 40, and serves to heat and fix the toner image onto the paper. The paper, after fixing, is discharged to a discharge tray 43 on the top surface of the housing 2 via a passage 42.

Next, the developing devices 11Y, 11M, 11C, 11K are explained in detail on their construction. Since the four developing devices are identical in basic construction, here is described a developing device 11Y representatively.

Figure 2:
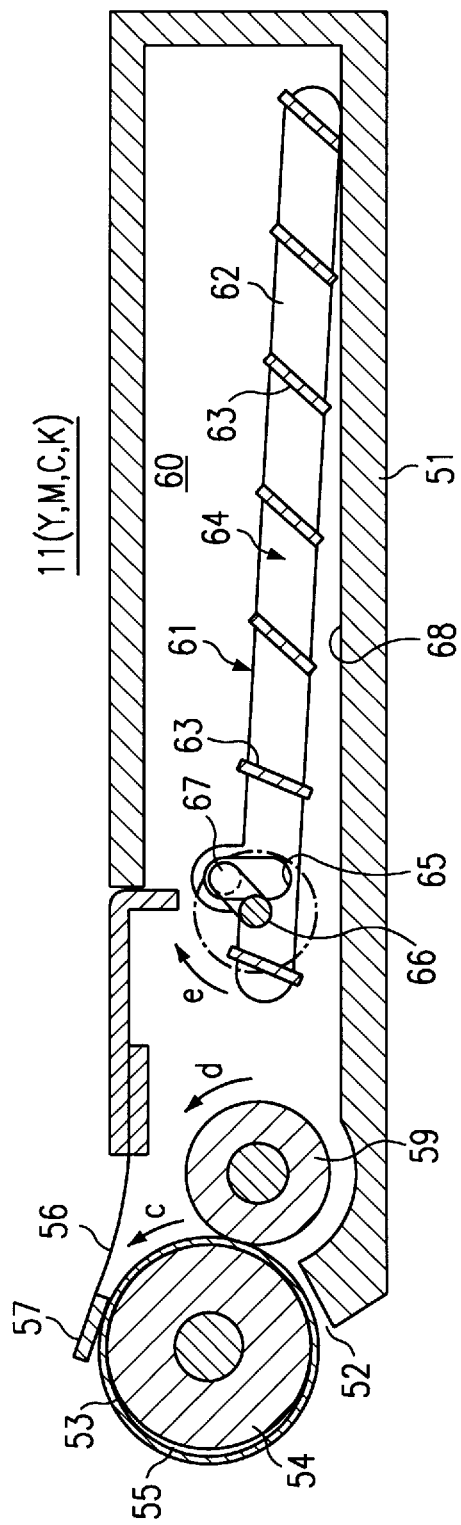
FIG. 2 is a front sectional view of the developing device.

FIG. 2 is a front sectional view of the developing device 11Y.

The developing device 11Y has a developing roller 54 at an opening 52 on the front side (photosensitive drum 3 side) of a flat housing 51. Fitted to the exterior of the developing roller 54 is a developing sleeve 53 formed of a cylindrical thin film having a perimeter slightly longer than the perimeter of the developing roller 54. The developing sleeve 53 is made of a resin such as polycarbonate or nylon, or a metal such as nickel.

On side walls that support both ends of the developing roller 54 and the developing sleeve 53, guide members (not shown) made of elastic material and being in contact with the rear outer peripheral surface of the developing sleeve 53 are provided on one side of the developing roller 54 opposite to the photosensitive drum 3. The developing sleeve 53 is biased by the guide members, so that its rear inner peripheral surface comes into close contact with the roller 54, and a loose portion 55 is formed at its front portion on the photosensitive drum side. Also, a plate-shaped blade 56 with one end fixed to the ceiling of the housing 51 is kept in contact with the top outer peripheral surface of the developing sleeve 53 via an about 1 mm thick restricting portion 57 provided at its free end. The restricting portion 57 may be formed of a soft elastic material other than the material of the blade 56, or the tip of the blade 56 may be bent so as to come into contact with the developing sleeve 53 at the bent portion. When the restricting portion 57 and the blade 56 are made of dissimilar materials, it is preferable that the blade 56 is composed of stainless, ribbon copper, or phosphor bronze, while the restricting portion 57 is composed of an abrasive material such as silicon or nylon.

A toner feed roller 59 is disposed on the rear of the developing sleeve 53. This toner feed roller 59 has its outer peripheral surface formed, for example, from urethane foam.

A flat toner container 60 located on the rear of the toner feed roller 59 has a toner carrying mechanism 61 provided to move the toner contained in the toner container 60 toward the toner feed roller 59.

The toner carrying mechanism 61 is provided with a ladder-shaped carrying member 64 comprising support members 62, which extend forward and backward (right and left in FIG. 2) and which are arranged in proximity to both side walls of the housing 51, respectively, and seven feed members 63 which extend transverse (a direction vertical to the sheet surface of FIG. 2) and whose both ends are fixed to the support members 62.

Two feed members 63 on the front side are fixed at a tilt angle closer to the normal to the bottom surface of the housing 51 than the other five feed members 63, so that the two exert a larger force of carrying toner forward than the other five do. A long hole 65 extending up and down is provided at front portions of the support members 62. A pivot 66 is inserted through the long hole 65 so as to pass across the toner container 60. Also, the pivot 66 is bent into a U-shape at its a portion 67 where it passes through the long hole 65. Thus, with the rotation of the pivot 66, the U-shaped portion 67 is pivoted so that the carrying member 64 moves back and forth as well as up and down.

When the developing device 11Y with the above constitution is located at the developing-state position, unshown gears fixed to the end portions of the developing roller 54, the toner feed roller 59, and the pivot 66 are connected to the drive motor and rotated in the directions of arrows "c", "d", and "e", respectively. With the rotation of the pivot 66, the carrying member 64 repeats the toner feed operation. That is, when the U-shaped portion 67 of the pivot 66 is located above within its moving trace, the U-shaped portion 67 is in contact with the upper end portion of the long hole 65 so that the carrying member 64 has its front portion lifted and, as such, moves backward. In this movement, the rear edge side of the support members 62 moves backward in sliding contact with a bottom surface 68 of the toner container 60, so that the feed members 63 are kept out of contact with the bottom surface 68. Subsequently, when the front portion of the carrying member 64 comes into contact with the bottom surface 68 of the toner container 60 as the U-shaped portion 67 moves on with the rotation of the pivot 66, the feed members 63 move forward in sliding contact with the bottom surface 68 of the toner container 60 by the movement of the U-shaped portion 67. Also, when the U-shaped portion 67 has again come into contact with the top end portion of the long hole 65, the carrying member 64 is lifted at its front portion and, as such, moves backward.

By such movement of the carrying member 64, the toner, a one-component developer contained within the developing device 11Y, moves toward the toner feed roller 59 as the carrying member 64 moves forward. Meanwhile, when the carrying member 64 moves backward, the carrying member 64 has only its rear end portion brought into contact with the bottom of the toner container 60, so that the feed members 63 are kept away from the bottom surface 68. Accordingly, the toner located at the bottom will never be conveyed backward.

In addition, it is preferable that an elastic material such as rubber, sponge, or film is provided under the support members 62 and the feed members 63 so that any shocks and sounds can be relaxed when the carrying member 64 makes contact with the bottom surface 68.

The toner carried to near the toner feed roller 59 is fed to the developing sleeve 53 by the rotation of the toner feed roller 59, and held at the outer peripheral surface of the developing sleeve 53. The developing sleeve 53 is kept in close contact with the developing roller 54 by the guide members in press contact with both ends of the developing sleeve 53, and rotates in the direction of arrow "c" with the rotation of the developing roller 54. Then, the toner layer covering the outer periphery of the developing sleeve 53 is restricted by the restricting portion 57 of the blade 56 so as to be adjusted to a constant thickness. Also, the toner is charged to a specified polarity and potential by the contact with the blade restricting portion 57. In addition, the blade 56 is so positioned that a frictional force is given from its fixed portion toward its free end when the developing sleeve 53 and the restricting portion 57 are brought into contact with each other, allowing a stable contact with the developing sleeve 53 to be obtained.

The toner held at the outer periphery of the developing sleeve 53 is carried to the developing area 13Y by the rotation of the developing sleeve 53 driven by the developing roller 54. Then, the toner adheres to the latent image formed on the surface of the photosensitive drum 3 by electrostatic attraction, forming a toner image.

In this state, the loose portion 55 of the developing sleeve 53 that makes contact with the photosensitive drum 3 is out of contact with the developing roller 54, so that the developing sleeve 53 makes a soft, uniform contact with the photosensitive drum 3 and yet with a proper nip width maintained. Thus, a toner image of uniform thickness is formed enough to reproduce with fidelity the tones recorded when the latent image was formed. Further, even if a difference in tip speed is provided between the photosensitive drum 3 and the developing sleeve 53, there will occur no breakage to the toner image.

Figure 3:
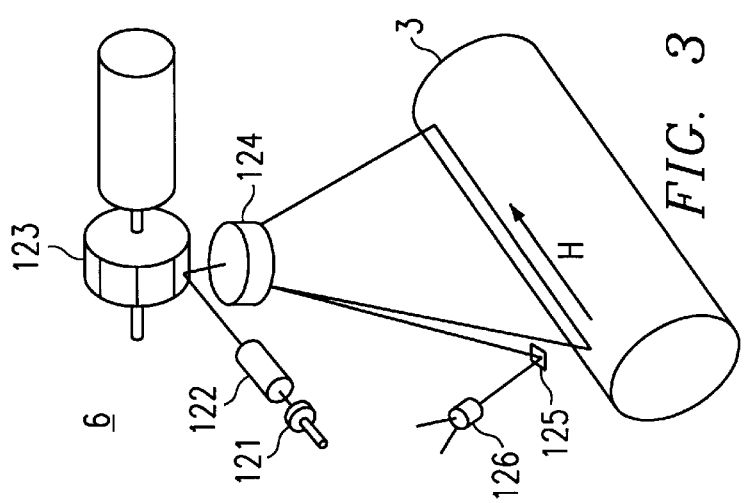
FIG. 3 is a perspective view illustrating the scanning optical system.

FIG. 3 briefly shows the construction of scanning optical unit 6. A semiconductor laser 121 emits a laser beam 7 in accordance with image information read from the memory of a control section not shown in the drawing. The laser beam 7 is collimated by a collimator lens 122, and deflected by a polygonal mirror 123. The deflected laser beam 7 passes through a fθ lens 124 and impinges the surface of photosensitive drum 3. The beam scanning of the surface of photosensitive drum 3 is realized via the rotation of the polygonal mirror 123. In the aforesaid beam scanning, the light at the starting edge of the laser beam scan line is reflected by a mirror 125, and arrives at a sensor 126. An output signal from the sensor 126 is used as a synchronization signal for beam scanning in the main scan (horizontal or row) direction H. Scanning in the sub-scanning direction (vertical or column), which is perpendicular to the main scan direction, is realized via the rotation of photosensitive drum 3.

Figure 4:
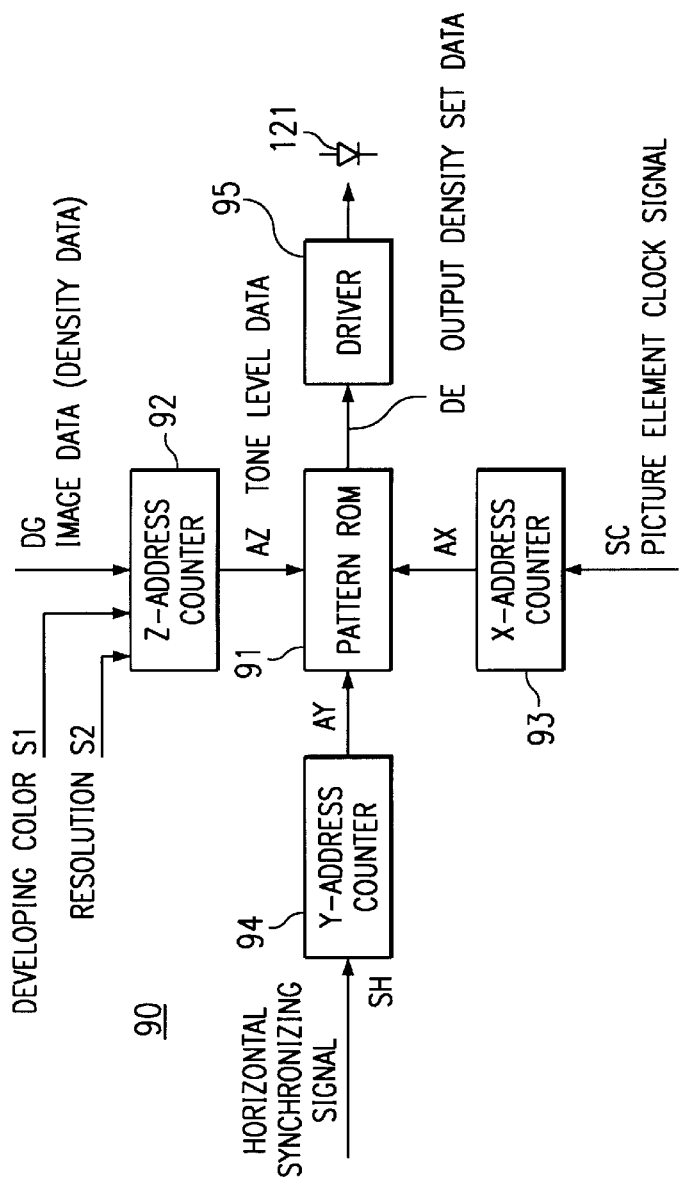
FIG. 4 is a block diagram of the modulation circuit for a semiconductor laser.

FIG. 4 is a block diagram of a modulation circuit 90 for the semiconductor laser 121, and FIG. 5 is an addressing timing chart.

The modulation circuit 90 comprises a pattern read only memory (ROM) 91, a Z-address counter 92, a X-address counter 93, a Y-address counter 94, and a driver 95, as shown in FIG. 4.

The pattern ROM 91 is provided as an output density setting means for setting the density of a print image, and stores a plurality of exposure patterns PS of m*n matrices. One exposure pattern is specified by the Z-address counter 92. Then, with respect to the specified exposure pattern, each cell (described below) is sequentially specified by the X-address counter 93 and the Y-address counter 94, and the value of each cell (1-bit) is output as an output density set data DE. Based on the output density set data DE, the semiconductor laser 121 is controlled to be turned on and off by the driver 95. The exposure pattern PS will be detailed later.

The Z-address counter 92 comprises a look-up table ROM for bit conversion of digital signals, and others. The Z-address counter 92 outputs Z-address AZ data for image data DG for every single picture element based on the 8-bit image data DG that is the density information (in 256 steps) in the units of picture elements and that has been read out from image memory or the like (not shown). Image data DG is input from image processing apparatus such as a computer or a word processor, or from an image reader.

Therefore, image data DG, which is density data of each picture element of the input image to the printer 1, is converted into tone level data (Z-address AZ) for tone reproduction in the printer 1. In addition, the Z-address counter 92 receives as address of the look-up table ROM inputs of signal S1, representing the developing color, and signal S2, representing the resolution together with the image data DG. The 2-address counter 92 thus and produces outputs of Z-address AZ optimized according to the color of output image and the specified resolution.

The X-address counter 93 counts the picture element clock signals SC and outputs said counter value as X-address AX. The picture element clock signal SC is a clock signal having a frequency k-fold (where k is a dividing number of picture element) greater than the image clock signal. While a single picture element of image data DG is being input, k discrete picture element clock signals SC are generated. X-address counter 93 repeatedly counts within a predetermined range corresponding to cells arrayed in the horizontal direction (main scan direction) of the exposure pattern. For example, if the exposure pattern PS size is 4 (vertical) by 16 (horizontal), the count is repeated in the range 0–15, as shown in FIG. 5.

The Y-address counter 94 counts the horizontal synchronization signals SH, and outputs the count value as Y-address AY. Y-address counter 94 repeatedly counts in a predetermined range corresponding to cells arrayed in the vertical direction (sub-scanning direction) of the exposure pattern. For example, if the size of exposure pattern PS is 4 (vertical) by 16 (horizontal), the counts is repeated in the range 0–3, as shown in FIG. 5.

The driver 95 controls the ON/OFF switching of semiconductor laser 121 based on data DE read out from pattern ROM 91.

Exposure pattern comprises an $m^*(m^*k)$ matrix wherein each element DT of a square matrix comprising m discrete elements DT in both horizontal and vertical direction are divided into k cells EM in the horizontal direction. Each cell EM is given a value of either "0" or "1". When a cell EM value is "0", semiconductor laser 121 is OFF. When a cell EM value is "1", semiconductor laser 121 is ON.

Accordingly, the area on the surface of photosensitive drum 3 corresponding to the ON state of semiconductor laser 121 is subjected to light exposure, thereby reducing the potential of said exposed area, such that predetermined colored toner adheres to the surface of the drum at such exposed areas, with the result that those areas are rendered black (or of another color) on the surface of recording paper PP. Conversely, the areas of the recording paper PP corresponding to the OFF state of semiconductor laser 121 are rendered white. Hereinafter, the cells EM having a value of "0" are designated EMW, and cells having a value of "1" are designated EMB.

The area of an image recorded in black on recording paper PP via a single EMB is not necessarily constant. That is, the area recorded in black on recording paper PP differs depending on whether or not the cell adjacent to a particular EMB is an EMW cell or an EMB cell, and further differs depending on whether or not said adjacent position is to the left or right or top or bottom.

This phenomenon is fully described hereinafter with reference to FIGS. 6–9.

Figure 7A:
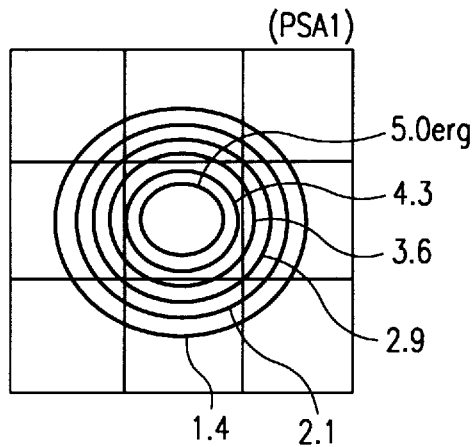
FIGS. 7A, 7B, 7C, and 7D show states of irradiated energy corresponding to the exposure patterns shown in FIG. 6.
Figure 7B:
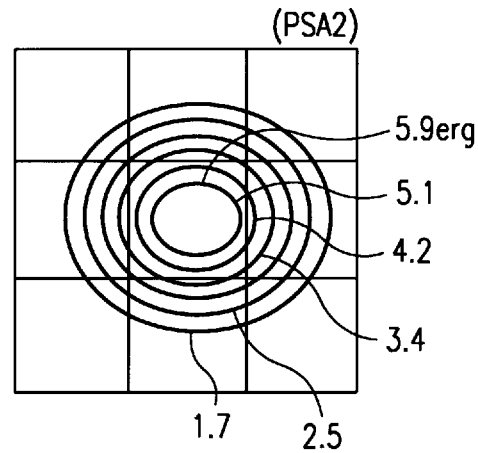
Figure 7C:
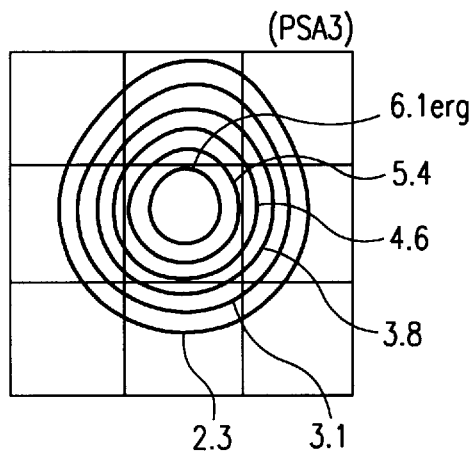
Figure 7D:
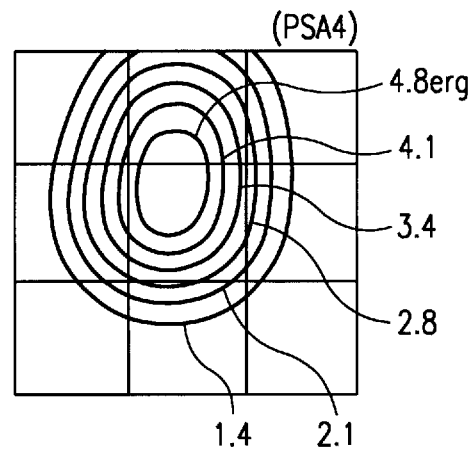
Figure 8A:
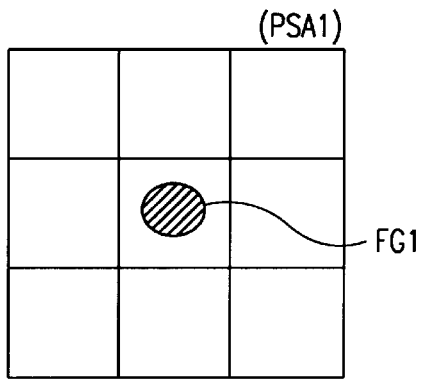
FIGS. 8A, 8B, 8C, and 8D show recording states on recording paper corresponding to the exposure patterns shown in FIG. 6.
Figure 8B:
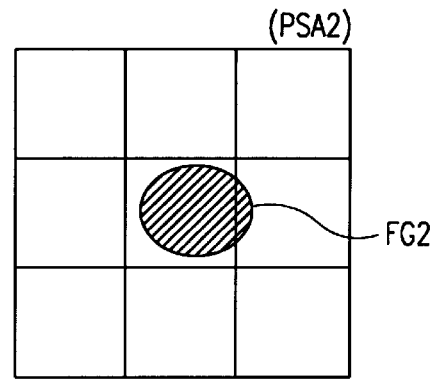
Figure 8C:
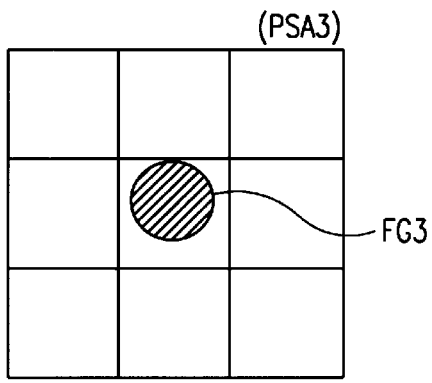
Figure 8D:
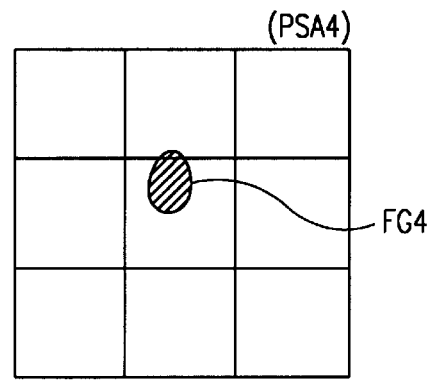
Figure 9:
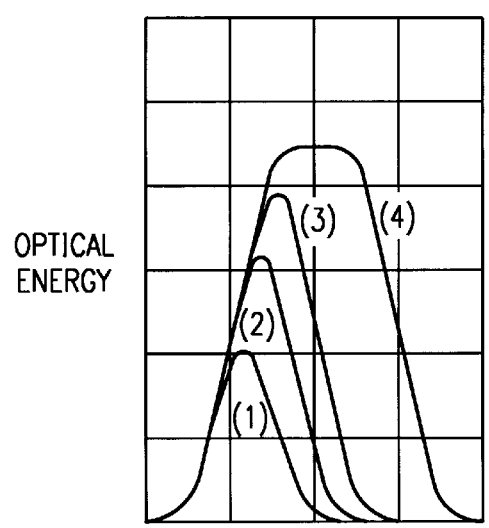
FIG. 9 is a chart showing a distribution state of irradiated energy by transverse movement of a laser beam.

FIGS. 6A, 6B, and 6D show examples of exposure patterns PSA1–PSA4, respectively. FIGS. 7A, 7B, 7C, and 7D show the optical energy states corresponding to exposure patterns PSA1–PSA4 of FIG. 6, respectively. FIGS. 8A, 8B, 8C, and 8D show the recording state on recording paper PP corresponding to exposure patterns PSA1–PSA4 of FIG. 6, respectively. FIG. 9 shows the optical energy distributions due to movement in the main scan direction by the laser beam. FIGS. 7 and 8 were derived by simulations. FIG. 8 shows the recording state with binarization using 5.2 erg as the threshold value.

Exposure patterns PSA1–PSA4 are $3^*12$ matrices wherein discrete elements DT of a square matrix of $3^*3$ elements are divided into four cells in the main scanning direction. In FIG. 6, EMW is indicated in white, and EMB is indicated in black.

EMB corresponds to the irradiation of the surface of photosensitive drum 3 by a laser beam emitted from semiconductor laser 121 when said semiconductor laser 121 is in the ON state. A single EMB corresponds to the irradiation, i.e., exposure, of the photosensitive drum per unit time. The total number of EMB is the total exposure time.

The discrete elements of the square matrix correspond to single picture elements of image data DG, and pulse width modulation of semiconductor laser 121 is accomplished to divide discrete elements into four segments. Laser beam 7 may be, for example, a round shape having a diameter of about 60 $\mu$m with a static state half-intensity width in the main scan direction and sub-scanning direction, such that the energy level is greater in the center portion of said beam and diminishes gradually approaching the outer boundary of said beam. After laser beam 7 scans a one-line segment in the main scan direction on the surface of photosensitive drum 3, the next line is scanned, such that adjacent cells EM in the main scan direction of the exposure pattern are scanned continuously, and adjacent cells EM in the sub-scanning direction are scanned non-continuously, i.e., discretely with spatial intervals.

As a result, when EMB cells are adjacent in the main scan direction, the optical energy of the laser beam is additively increased, such that the maximum optical energy increases, as shown in FIG. 9. Conversely, when EMB cells are adjacent in the sub-scanning direction, the participating optical energy is small, such that the maximum optical energy is not appreciably greater. That is, even when the number of EMB cells is identical, i.e., the total exposure time is identical, EMB cells adjacent and continuous in the main scan direction, the maximum optical energy increases, whereas when the EMB cells are adjacent in the sub-scanning direction, the maximum optical energy is less. Accordingly, even though the total exposure time, i.e., irradiation energy amount, is identical, electrostatic latent images are formed on the surface of photosensitive drum 3 via different optical energies.

In electrophotographic recording, toner adheres only to areas that have received optical energy which surpasses a particular threshold value in accordance with the sensitivity of the photosensitive drum 3 and magnitude of the developing bias, thereby developing a latent image.

Accordingly, when developing electrostatic latent images formed by mutually different optical energies, the areas of the formed images are different. That is, even though the number of individual EMB cells is identical, the areas of the image recorded on the recording paper PP can differ by changing the arrangement positions of the EMB cells. Using this principle, recording of mutually dissimilar tones can be realized due to mutually different EMB cell positions in relation to a plurality of exposure patterns having mutually identical numbers of EMB cells.

In FIG. 6A, exposure pattern PSA1 has a total of four EMB cells, and the center element DT is recorded as black. In this instance, the optical energy produces nearly concentric circles, as shown in FIG. 7A, and a circular black image FG1 in the center is recorded, as shown in FIG. 8A.

In all the remaining exposure patterns, PSA2–PSA4, of FIG. 6, the total number of EMB cells is five, and 5/4 elements DT are recorded. The positions of the EMB cells in these patterns are mutually dissimilar. In exposure pattern PSA2, five EMB cells are arranged consecutively in the horizontal direction; in exposure pattern PSA3, a single EMB cell is arranged on the line above the other four EMB cells; in exposure pattern PSA4, two EMB cells are arranged on the line above the other three EMB cells.

Thus, as shown in FIGS. 7A, 7B, 7C, and 7D, the optical energy is greatest for exposure pattern PSA2, having five consecutive EMB cells in the horizontal direction, and the optical energy is least for exposure pattern PSA4, having the fewest number of consecutive cells. Therefore, as shown in FIGS. 8A, 8B, 8C, and 8D, image FG2 corresponding to exposure pattern PSA2, is largest, and image FG4 (FIG. 8D), corresponding to exposure pattern PSA4 is smallest. The dot area ratios (%) of images FG1–FG4 of exposure patterns PSA1–PSA4 were 2.6, 8.0, 5.0, and 1.3, respectively. As can be clearly understood from a comparison of images FG1 and FG4, even if the number of EMB in PSA1 is lower than that of EMB in PSA4, the area of the image FG1 in PSA1 is larger than that of the images FG4 in PSA4 because of the position of EMB cells of the exposure pattern.

As previously described, it is possible to increase the number of tone levels by changing the positions of EMB cells while maintaining uniformity of the element dividing number and size of the matrix of the exposure patterns. That is, the number of tone levels can be increased without reducing resolution. Linearized tonal characteristics can be obtained by combining the total number of EM cells and the position of discrete EM cells.

Returning now to FIG. 4, when image data DG are 8-bit data expressing 64 tone levels including all white and all black, 64 individual exposure patterns are stored in the pattern ROM 91.

Figure 10A:
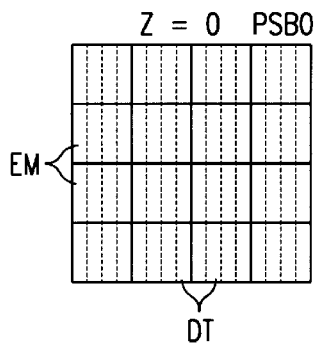
FIGS. 10A–10X show is views showing examples of exposure patterns stored in the pattern ROM.
Figure 10B:
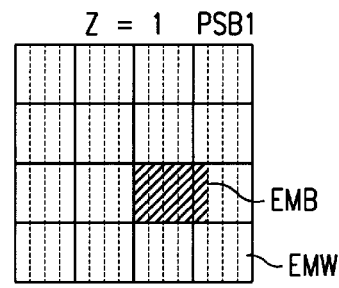
Figure 10C:
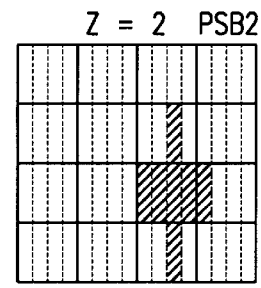
Figure 10D:
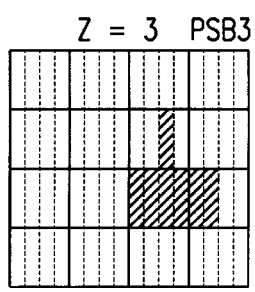
Figure 10E:
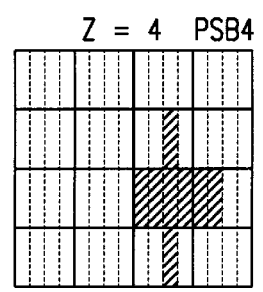
Figure 10F:
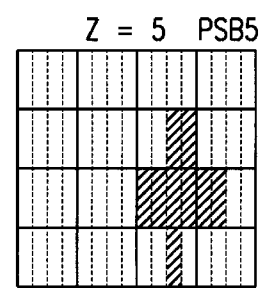
Figure 10G:
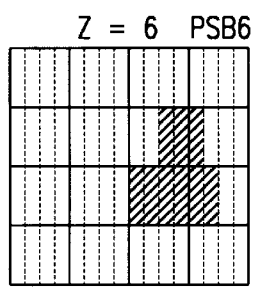
Figure 10H:
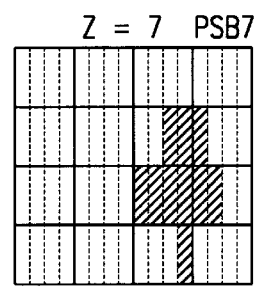
Figure 10I:
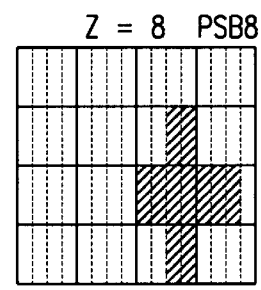
Figure 10J:
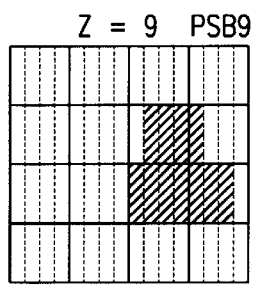
Figure 10K:
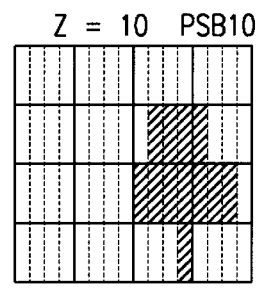
Figure 10L:
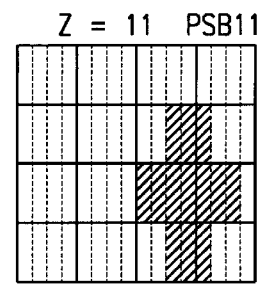
Figure 10M:
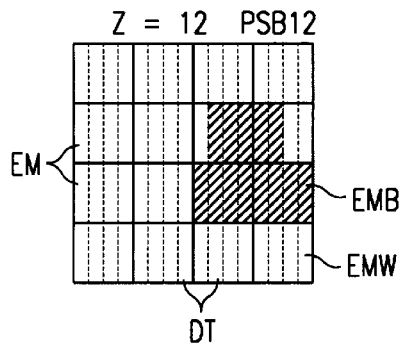
Figure 10N:
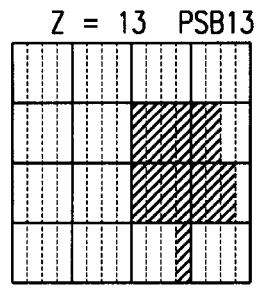
Figure 10O:
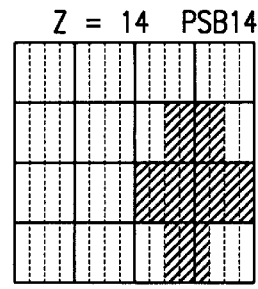
Figure 10P:
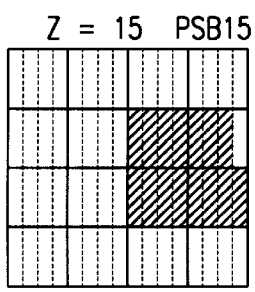
Figure 10Q:
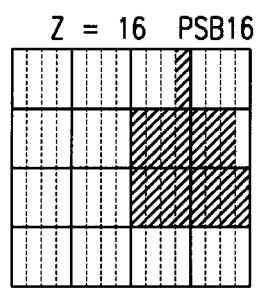
Figure 10R:
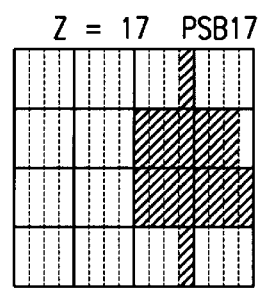
Figure 10S:
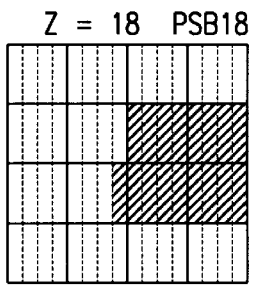
Figure 10T:
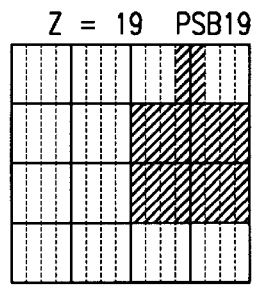
Figure 10U:
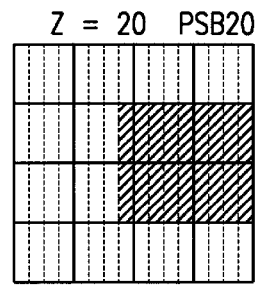
Figure 10V:
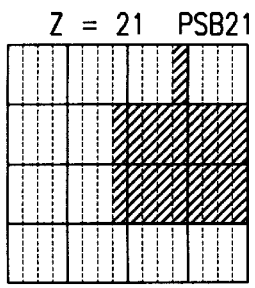
Figure 10W:
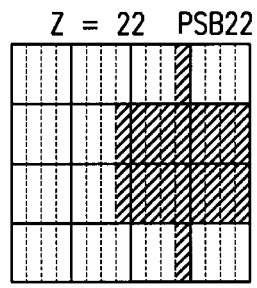
Figure 10X:
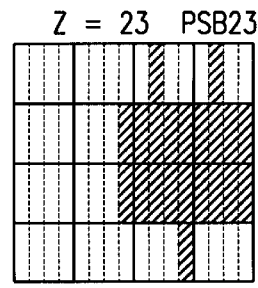

FIGS. 10A through 10X show examples for lower density value discrete exposure patterns PSB0–PSB23 stored in pattern ROM 91. Exposure patterns PSB0–PSB23 are 4*16 matrices wherein each element DT of a 4*4 dot square matrix is divided into four segments in the horizontal direction. In the drawing, EMW indicates a white cell, and EMB indicates a black cell.

The aforesaid exposure patterns PSB0–PSB23 express exposure patterns of tones a part from level "0" to level "63" among the 64 tone levels, and express the Z-addresses 0–23, respectively. These exposure patterns PSB0–PSB23 are selectable so as to obtain linear output characteristics relative to the scanning optical unit 6 having the optical characteristics described below.

Resolution: 2400 DPI in main scan direction 600 DPI in sub-scanning direction

Image clock: 8.9 MHz

Laser intensity: 0.23 mW

Static beam diameter (half-intensity): 60 μm in both main and sub-scan directions In the Z-address counter 92, Z-address Z is generated which corresponds to the image data DG value, and which specifies one of the exposure patterns PSB. Cells EM of the specified exposure patterns PSB are sequentially read according to X-address AX and Y-address AY specified by the X-address counter 93 and the Y-address counter 94 and generated as data DE, and the semiconductor laser 121 is switched ON/OFF in accordance with the value of said data DE. Said Z-address AZ, X-address AX, and Y-address AY may be combined as necessary, to accomplish pattern ROM 91 address specification via said combined addresses.

According to the construction of the present embodiment, the number of tone levels can be determined by the number of exposure patterns, and the tone levels can be set fractionally.

Furthermore, although the value of each EM cell is binary in the present embodiment as described above, it is to be noted that said values may be ternary or greater. Ternary or greater values allow increase the number of tone levels and improve image quality. Furthermore, the dividing number k may be decreased, and that fraction augmented by multilevel values to maintain the same number of tones, while reducing frequency of the picture element clock signal SC.

FIGS. 11A, 11B, and 11C show ternary exposure patterns PSC1–PSC3. FIG. 12A shows a state of irradiated energy, and FIG. 12B showing a recording state on recording paper corresponding to the exposure pattern shown in PSC2 of FIG. 12.

Exposure patterns PSC1–PSC3 are 3*12 matrices wherein each element DT of a 3*3 dot square matrices is divided into four segments in the horizontal direction, and each cell EM is a value of either "0", "1", or "2". In the following description, cells with a value of "0" are designated EMW, cells with a value of "1" are designated EMG, and cells with a value of "2" are designated EMB. In FIGS. 11A, 11B, and 11C, EMW cells are white, EMG cells are gray, and EMB cells are black. FIGS. 12(A) and 12(B), respectively show optical energy states and recording states on recording paper PP corresponding to the exposure patterns PSC2.

Although semiconductor laser 121 is switched ON in correspondence with EMG an EMB, said laser is ON as the rated intensity for EMB and ON at one half the rated intensity for EMG.

Even when the total number of cells EMB and EMG are identical in the aforesaid exposure patterns PSC, the ratio of cells EMB to EMG, and their relative positional arrangements produce different areas of image FG recorded on recording paper PP. Accordingly, the number of tones may be increased to a number greater than the aforesaid exposure patterns PSA.

Although recorded at identical threshold values, the area of image FG (not shown) for exposure pattern PSC1 is between the aforesaid exposure patterns PSA1 and PSA2, the area in exposure pattern PSC2 is greater than that of PSC3, and the maximum optical energy in pattern PSC3 is below the threshold value such that the image cannot be recorded. The dot area ratio (%) of the images FG in exposure patterns PSC1–PSC3 are 5.1, 3.8, and 0.0, respectively.

Next described is the method for smoothing the variations in tone levels.

In the pattern ROM 91 has been stored a plurality of exposure patterns PS corresponding to the number of tone levels for each color of Y, M, C, and K. Input/output characteristics of the pattern ROM 91, i.e., the relationship between Z-address AZ (hereinafter, referred to also as tone level data) and the output density set data DE, have been set for each color.

The input/output characteristics of the pattern ROM 91 are described below.

FIG. 13 is a graph showing the relationship between density and limit density difference.

The limit density difference is a minimum value of density differences that can be discriminated by the naked eye. For example, with respect to Y (yellow) in FIG. 14, with a density of dot area ratio 40%, the limit density difference is 1.88% in dot area ratio. In other words, on the assumption that an image of dot area ratio 40±α% is located adjacent to another image of a uniform density of dot area ratio 40%, if α exceeds 1.88, then the density difference between two images, i.e., the image boundary (herein referred to as "Mach band") can be discerned. If the value of the density difference is below the curves in the graph of FIG. 13, the Mach band cannot be discerned.

Figure 14:
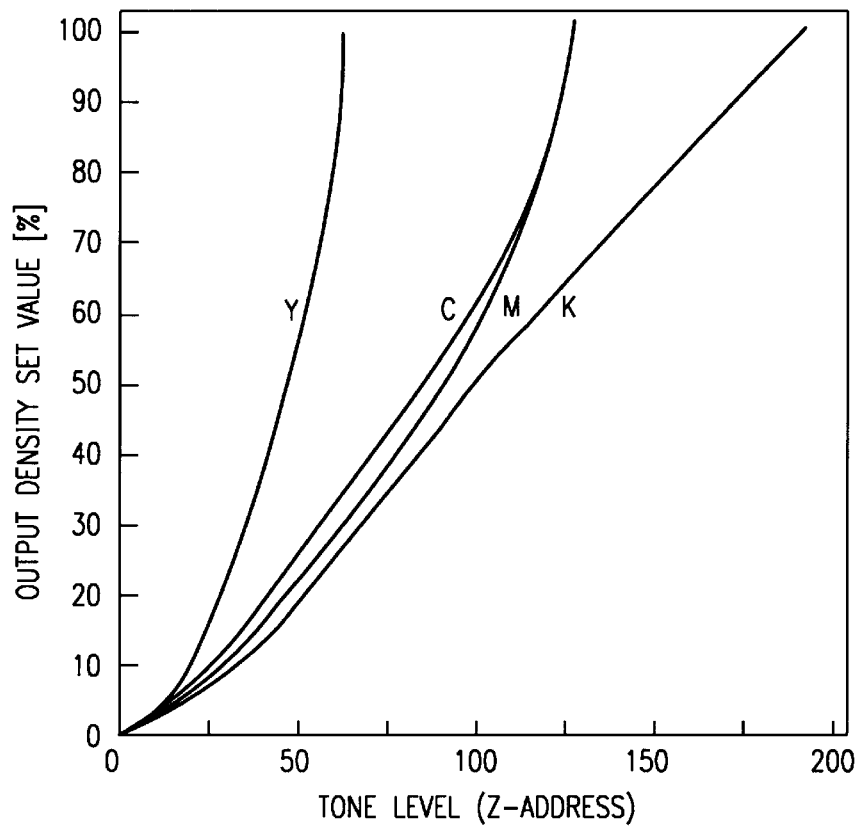
FIG. 14 is a graph showing input/output characteristics of the pattern ROM.

As shown in FIG. 14, the relationship between density and limit density difference varies depending on the color, such that K has an almost constant limit density difference irrespectively of whether the density is high or low, whereas. Y, M, and C have smaller limit density differences with lower densities. That is, particularly with the colors of Y, M, and C, density variations can be discerned more sensitively when the density is low than when the density is high.

FIG. 14 is a graph showing input/output characteristics of the pattern ROM 91. In FIG. 14, the horizontal axis for input represents the tone level (value of Z-address AZ for specifying an exposure pattern PS), while the vertical axis for output represents the output density set value that depends on the exposure pattern PS. The output density set value is represented in percentage with the maximum density assumed as 100.

Characteristic curves for individual colors in FIG. 14 show results of determining the output density set value for each tone level in such a way that the number of tones is as small as possible and that the difference in output density set value between tone level (n) and tone level (n+1) does not exceed the limit density difference, i.e., the so-called "Mach band free" state that the Mach band cannot be discerned can be obtained. More specifically, for example, in the case of Y, an approximation (Equ. (1)) corresponding to the characteristics of FIG. 13 is obtained, and then the output density set value for a first tone level 0 is determined by substituting initial value "0" into the approximation of Equ. (1). The result is again substituted into the approximation of Equ. (1), whereby the output density set value for a second tone level 1 is determined. Like this, by repeating the process of substituting the preceding result to obtain the succeeding result until the result (output density set value) reaches 100, the output density set values for the individual tone levels are set.

$$Y; f(D) = 9.11 \times 10^{-9} D^5 - 1.66 \times 10^{-6} D^4 + 1.18 \times 10^{-4} D^3 - 4.20 \times 10^{-3} D^2 + 1.04 \times 10^{-1} D + 0.2 \quad (1)$$

In the case of Y, the result reached 100 at the 64th tone level 63. That is, the number of tones required at minimum to realize the "Mach band free" state is 64 for Y. Similarly, the required number of tone levels for M and C is 128, and that for K is 192.

In addition, the characteristics for M, C, and K in FIG. 13 can be expressed by approximations (2), (3), and (4), respectively:

$$M; f(D) = 6.13 \times 10^{-9} D^5 - 1.23 \times 10^{-6} D^4 + 9.64 \times 10^{-5} D^3 - 3.57 \times 10^{-3} D^2 + 6.46 \times 10^{-2} D + 0.2 \quad (2)$$

$$C; f(D) = 1.27 \times 10^{-5} D^3 - 1.27 \times 10^{-3} D^2 + 4.21 \times 10^{-2} D + 0.2 \quad (3)$$

$$K; f(D) = 3.33 \times 10^{-6} D^3 - 5.78 \times 10^{-4} D^2 + 2.89 \times 10^{-2} D + 0.2 \quad (4)$$

Also, as apparent from FIG. 14, in the cases of Y, M, and C, the variation in output density set value between one tone level and the subsequent tone level increases as the density increases from low density toward high density over the entire tone level ranges of Y, M, and C (e.g., a range of tone levels 0 to 63 for Y). With regard to K, the variation in output density set value increases with increasing density toward higher-density in the vicinity of the lower-density end portion of the tone level range, while the variation is kept nearly constant in the other portions.

In order that such input/output characteristics can be obtained, a plurality of exposure patterns PS corresponding to the required number of tone levels for each color are stored in the pattern ROM 91. That is, 64 exposure patterns PS with different output density set values including full-white and full-black patterns are stored for Y; likewise, 128 exposure patterns PS are stored for M and C, and 192 exposure patterns PS are stored for K. For each color, one exposure pattern PS is selected according to the tone level designated by the Z-address AZ.

Next, input/output characteristics of the Z-address counter 92 are described.

Figure 15:
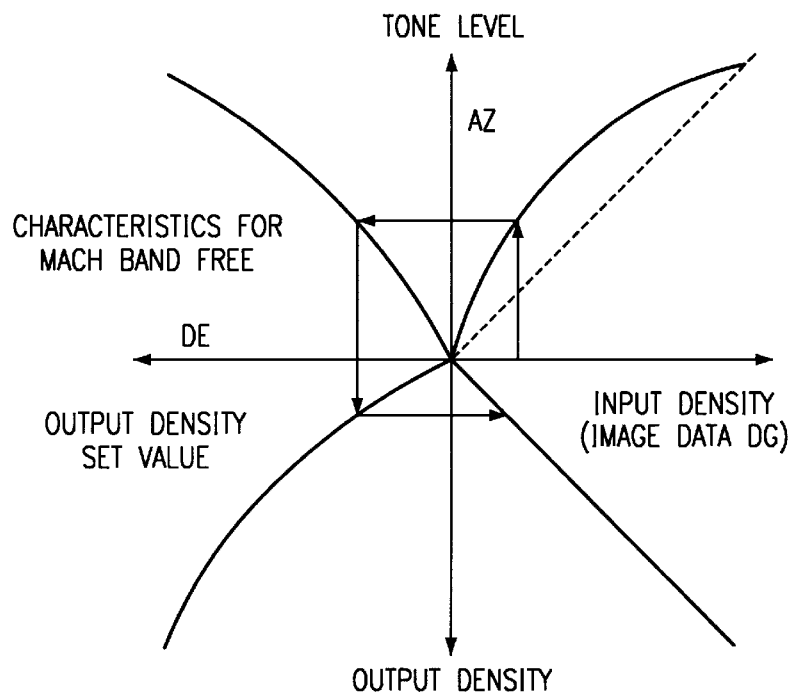
FIG. 15 is a view showing correlations among data in the modulation circuit.
Figure 16:
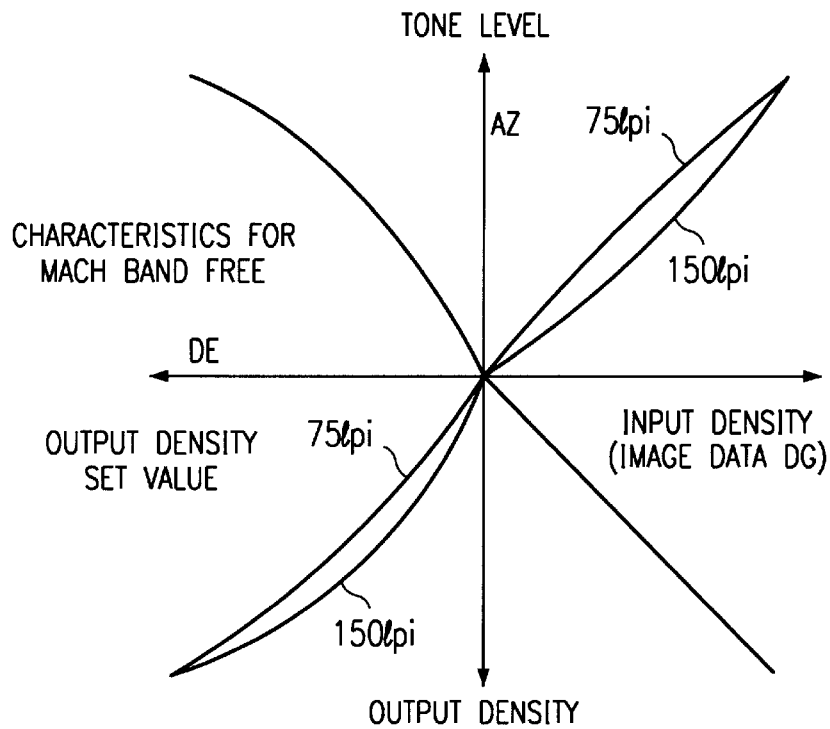
FIG. 16 is a view showing the contents of correction to the dot gain.

FIG. 15 is a view showing correlations among data of the modulation circuit 90, and FIG. 16 is a view showing the contents of correction to the dot gain. In FIG. 15, the quadrant I shows the relationship between input density represented by image data DG and tone level represented by Z-address AZ, i.e., the input/output characteristics of the Z-address counter 92. The quadrant II shows the relationship between tone level AZ and output density set value represented by data DE, i.e., the input/output characteristics of the pattern ROM 91. The quadrant III shows the relationship between output density set value DE and output density (density of the image actually reproduced on recording paper through electrophotographic processes). Further, the quadrant IV shows the relationship between input density and output density, i.e., the general input/output characteristics of the printer 1.

The Z-address counter 92, as described above, converts the image data DG of 256 tone levels into tone level data (Z-address AZ) of a number of tone levels corresponding to the color specified by the signal S1.

For this conversion process, in this embodiment, the input/output characteristics of the Z-address counter 92 are set so that the output density characteristics with respect to image data DG of the quadrant IV become linear. The characteristics of the quadrant II are made non-linear with a view to obtaining the Mach band free state as described before, and the characteristics of the quadrant III is also non-linear for various factors of the electrophotographic processes. Therefore, in the Z-address counter 92, input density is converted into tone levels taking into account the characteristics of the pattern ROM 91 and electrophotographic processes.

The color page printer 1 is capable of switching the resolution in the sub-scanning direction (75/150 lines/inch). Therefore, with a view also to the dot gain, which is a phenomenon unique to the dot matrix method, the input density is converted into tone levels. The dot gain refers to a phenomenon where differences in actual output density occur depending on the resolution even if the same exposure pattern PS is used.

More specifically, as shown in FIG. 16, in the electrophotographic processes, since the output density is higher with high resolution than with low resolution (quadrant III), the contents of the conversion to tone levels are changed as the resolution is switched over (quadrant I).

To summarize the above explanation, the modulation circuit 90 ensures the Mach band free state by the setting of input/output characteristics of the pattern ROM 91, and in order to obtain desired characteristics of the color page printer 1 as evaluated from external, necessary correction is executed at a stage where the number of tone levels is converted by the Z-address counter 92.

Figure 17:
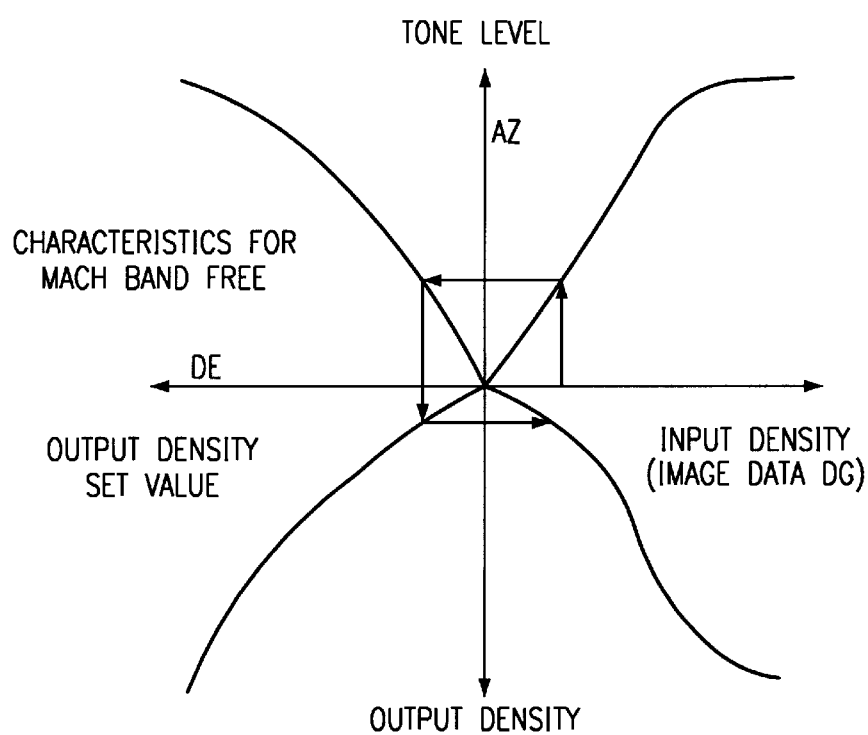
FIG. 17 is a view showing another example of the correlations among data in the modulation circuit.

In addition, if non-linear characteristics such as high gamma characteristics are desired as the characteristics of the color page printer 1 as evaluated from external, it is proper to set the relationship between input density and tone level according to the non-linear characteristics as shown in FIG. 17.

In the above-described embodiments, the contents of the pattern ROM 91 may be changed in various ways without departing from the spirit of the present invention. Further, the constitution of the printer, including the circuit construction of the modulation circuit 90, is not limited to the example illustrated in the drawings.

Although a scanning optical system 6 having a semiconductor laser 121 is used in the previously described embodiment, it is to be understood that an optical system having an LED array, liquid crystal, PLZT or the like may be alternatively used.

A single element DT of exposure patterns PS correspond on one-to-one basis with a single picture element of image data DG in the present embodiment, but is to be noted that a single exposure pattern PS may correspond to a single picture element of image data DG. Furthermore, a plurality of elements DT of exposure pattern PS may correspond to a single picture element of image data DG, and a single cell EM or a plurality of cells EM may correspond to a single picture element of image data DG.

Although the previously described embodiment has been described in terms of exposure patterns, wherein the screen angle is at 0 and recording image is thickened at a single point, this method is obviously applicable to other types of exposure patterns. For example, when applied to fill color printers, use of exposure patterns which set different screen angles for each color may similarly be considered for normal printing.

The data conversion for smoothing the tone levels can be applied also to cases where images are recorded by some processes other than the electrophotographic processes or where images are visualized and recorded (or displayed).

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A tone image processing apparatus comprising a converter to receive tone image data, select a pattern from a plurality of stored patterns based on a tone level of the received tone image data, and convert the tone image data to reproduction image data based on the selected pattern, wherein each pattern has a plurality of cells arranged in a matrix, each cell being capable of indicating at least a first state and a second state, to represent an output density value according to a number and position of cells in a first state within the matrix, wherein said plurality of patterns respectively correspond to a plurality of tone levels of the tone image data, and a difference between one output density value, represented by a pattern assigned to one tone level, and a next output density value, represented by a pattern assigned to a next tone level, is increased over all the tone levels as the tone levels become higher.

2. A tone image processing apparatus as claimed in claimed 1, wherein said converter has a plurality of pattern sets, each pattern set corresponding to at least a portion of tone images of a plurality of tone images, said tone image processing apparatus processing said plurality of tone images.

3. A tone image processing apparatus as claimed in claim 2, wherein one portion of said tone images differ from another portion of said tone images of said plurality of tone images by color.

4. A tone image processing apparatus as claimed in claim 3, wherein a total number of tone levels is different with each color and a total number of patterns included in each pattern set is different with each color.

5. A tone image processing apparatus as claimed in claim 4, wherein a density value difference between specified tone levels is different with each color.

6. A tone image processing apparatus as claimed in claim 5, wherein said density value difference between tone levels is unrecognizable to a naked eye.

7. A tone image processing apparatus as claimed in claim 1, further comprising an image forming device which forms an image in accordance with the reproduction image data which is provided from said converter.

8. A tone image processing apparatus as claimed in claim 7, wherein said converter includes:

a selector, which selects one pattern from the plurality of patterns in accordance with a tone level of image data to be formed by said image forming device, and counters, which synchronously address the cells in the pattern selected by said selector with a vertical and horizontal image forming operation of said image forming device.

9. A tone image processing apparatus as claimed in claim 7, wherein said plurality of patterns includes at least two patterns having an identical number of cells in the first state but such cells are in different positions within their respective matrices.

10. A tone image processing method comprising the steps of:

establishing a non-linear relationship between an input tone level of image data and an output density value by assigning a pattern to each tone level of a plurality of tone levels, each of said patterns having a plurality of cells arranged in a matrix, each cell being capable of indicating a first state or a second state, to represent a respective output density value according to the position of first state cells within the matrix; and converting tone image data to binary image data based on said relationship;

wherein, for said non-linear relationship, a difference between one output density value, represented by the pattern assigned to one tone level, and a next output density value, represented by the pattern assigned to a next tone level, is increased over all the tone levels as the tone levels becomes higher.

11. A tone image processing method as claimed in claim 10, further comprising a step of correcting said non-linear relationship by converting input image signals to the input tone image data before said converting step.

12. A tone image processing method as claimed in claim 10, wherein said converting step includes steps of:

selecting one pattern from said plurality of patterns based on a tone level of the input tone image data, and converting the tone image data to binary image data by using the selected pattern.

* * * * *

UNITED STATES PATENT AND TRADEMARK OFFICE
CERTIFICATE OF CORRECTION

PATENT NO.   : 5,828,397
DATED        : October 27, 1998
INVENTOR(S)  : Goto, et al It is certified that error appears in the above-identified patent and that said Letters Patent is hereby corrected as shown below:

In column 15, line 45, claim 5, delete "4" and insert --3--.

Signed and Sealed this

Fourteenth Day of September, 1999

Attest:

Q. TODD DICKINSON

*Attesting Officer*     *Acting Commissioner of Patents and Trademarks*